(12) United States Patent
Lee et al.

(10) Patent No.: US 11,514,318 B2
(45) Date of Patent: Nov. 29, 2022

(54) MULTI-SOURCE TRANSFER LEARNING FROM PRE-TRAINED NETWORKS

(71) Applicants: International Business Machines Corporation, Armonk, NY (US); Massachusetts Institute of Technology, Cambridge, MA (US)

(72) Inventors: Joshua Ka-Wing Lee, Cambridge, MA (US); Prasanna Sattigeri, Acton, MA (US); Gregory Wornell, Wellesley, MA (US)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 395 days.

(21) Appl. No.: 16/843,173

(22) Filed: Apr. 8, 2020

(65) Prior Publication Data
US 2021/0319303 A1 Oct. 14, 2021

(51) Int. Cl.
*G06N 3/04* (2006.01)
*G06N 3/08* (2006.01)

(52) U.S. Cl.
CPC ............. *G06N 3/08* (2013.01); *G06N 3/0454* (2013.01); *G06N 3/0472* (2013.01)

(58) Field of Classification Search
CPC ...... G06N 3/0454; G06N 3/0472; G06N 3/08; G06N 3/04
USPC .......................................................... 706/25
See application file for complete search history.

(56) References Cited

U.S. PATENT DOCUMENTS

| 10,223,586 B1* | 3/2019 | Leibovitz | G06V 10/82 |
|---|---|---|---|
| 10,360,901 B2* | 7/2019 | Sainath | G10L 15/16 |
| 2015/0161995 A1* | 6/2015 | Sainath | G10L 15/063 |
| | | | 704/232 |
| 2017/0024641 A1* | 1/2017 | Wierzynski | G06N 3/0454 |

(Continued)

OTHER PUBLICATIONS

Authors et al.: Disclosed Anonymously; "Incremental Sharing Using Machine Learning"; An IP.com Prior Art Database Technical Disclosure; IP.com No. IPCOM000252683D; IP.com Electronic Publication Date: Feb. 1, 2018; 33 Pages.

(Continued)

*Primary Examiner* — Huyen X Vo
(74) *Attorney, Agent, or Firm* — Cantor Colburn LLP; Stosch Sabo

(57) ABSTRACT

Examples described herein provide a computer-implemented method that includes training, by one or more processing devices, a first neural network for classification based on training data in accordance with a first learning objective, the first neural network producing an intermediate feature function and a final feature function as outputs. The computer-implemented method further includes training, by the one or more processing devices, a second neural network for classification based on the intermediate feature function and the final feature function and further based at least in part on target task samples in accordance with a second learning objective. Training the second neural network includes computing maximal correlation functions of each of the intermediate feature function, the final feature function, and the target task samples.

20 Claims, 10 Drawing Sheets

(56) References Cited

U.S. PATENT DOCUMENTS

| | | | |
|---|---|---|---|
| 2019/0042743 A1* | 2/2019 | Chen | G06N 20/00 |
| 2019/0095464 A1* | 3/2019 | Xie | G06K 9/6217 |
| 2019/0095764 A1* | 3/2019 | Li | G06K 9/6256 |
| 2019/0180144 A1* | 6/2019 | Tsishkou | G06N 3/0454 |
| 2020/0210809 A1* | 7/2020 | Kaizerman | G06N 3/04 |
| 2020/0285939 A1* | 9/2020 | Baker | G06N 3/082 |
| 2021/0287040 A1* | 9/2021 | Al-Qunaieer | G06V 10/25 |
| 2021/0319303 A1* | 10/2021 | Lee | G06N 3/08 |

OTHER PUBLICATIONS

Authors et al.: Disclosed Anonymously; "Machine Learning Algorithms for Smart Meter Diagnostics; An IP.com Prioi Art Database Technical Disclosure"; IP.com No. IPCOM000242462D; IP.com Electronic Publication Date: Jul. 16, 2015; 53 Pages.

Christodoulidis et al.; "Multi-Source Transfer Learning with Convolutional Neural Networks for Lung Pattern Analysis"; Retrieved Online from arXiv:1612.02589v1 [cs.CV]; Dec. 8, 2016; 9 Pages.

Lee et al.; Grace Period Disclosure; "Learning New Tricks from Old Dogs: Multi Source Transfer Learning from Pre-Trained Networks"; Dept. EECS, MIT; MIT-IBM Watson AI Lab, IBM Research; 2019; 1 Page.

Lee et al.; Grace Period Disclosure; "Learning New Tricks From Old Dogs: Multi-Source Transfer Learning From Pre-Trained Networks"; MIT-IBM Watson AI Lab, IBM Research; Nov. 21, 2019; 10 Pages.

Li et al.; "DELTA: Deep Learning Transfer Using Feature Map with Attention for Convolutional Networks"; Retrieved Online from arXiv:1901.09229v2 [cs.LG]; Apr. 26, 2019; 13 Pages.

Lundström; "Data-Efficient Transfer Learning with Pre-Trained Networks"; Master of Science Thesis in Electrical Engineering; Department of Electrical Engineering, Linköping University; 2017; 69 Pages.

Peng et al.; "Moment Matching for Multi-Source Domain Adaptation"; Retrieved Online from arXiv:1812.01754v4 [cs.CV]; Aug. 27, 2019; 24 Pages.

\* cited by examiner

Algorithm 1: Extracting maximal correlation parameters

Data: zero-mean, unit-variance feature functions $\{f_i^{s_n}\}$ and target task samples
$\{(x_1^t, y_1^t), \ldots, (x_k^t, y_k^t)\}$

Result: associated maximal correlations $\{\sigma_{n,i}\}$ and correlation functions $\{g_i^{s_n}\}$ for $n = 1, \ldots, N$ do
    for $i = 1, \ldots, l_n$ do
        for $y \in \mathcal{Y}^t$ do
            $g_i^{s_n}(y) \leftarrow \mathbb{E}_{P_{X|Y}^t}[f_i^{s_n}(X)|y]$
        end
        $\sigma_{n,i} \leftarrow \mathbb{E}_{P_{X,Y}^t}[f_i^{s_n}(X)g_i^{s_n}(Y)]$
    end
end
return $\{g_i^{s_n}\}, \{\sigma_{n,i}\}$

*FIG. 4*

Algorithm 2: Prediction with the maximal correlation weighting method

Data: maximal correlation functions $\{f_i^{s_n}\}$ and $\{g_i^{s_n}\}$ with associated correlations $\{\sigma_{n,i}\}$, empirical class label distribution $\hat{P}_Y^t$, and target task sample $x^t$

Result: class label prediction $\hat{y}^t$ given $x^t$

Initialize $\hat{P}_{Y|X}^t(y|x^t) = \hat{P}_Y^t(y)\mathbb{1}_{y \in \mathcal{Y}^t}$ for $n = 1, \ldots, N$ do
    for $i = 1, \ldots, l_n$ do
        $\hat{P}_{Y|X}^t(y|x^t) = \hat{P}_{Y|X}^t(y|x^t) + \hat{P}_Y^t(y)\sigma_{n,i}f_i^{s_n}(x^t)g_i^{s_n}(y)$
    end
end return $\arg\max_y \hat{P}_{Y|X}^t(y|x)$

Experimental results on target task for the CIFAR-100 dataset
(10 source tasks, 2-way classification).

| Method | 5-Shot Accuracy |
|---|---|
| Best Single Source SVM | 67.0 ± 3.0 |
| Best Single Source MCW | 69.0 ± 3.0 |
| Multi-Source SVM | 72.8 ± 2.7 |
| Multi-Source MCW | 78.1 ± 0.8 |

610

Experimental results on target task for the Tiny ImageNet dataset
(10 source tasks, 5-way classification).

| Method | 5-Shot Accuracy |
|---|---|
| Best Single Source SVM | 31.4 ± 0.9 |
| Best Single Source MCW | 33.9 ± 1.0 |
| Multi-Source SVM | 42.5 ± 1.4 |
| Multi-Source MCW | 47.4 ± 1.1 |

*FIG. 6*

MULTI-SOURCE TRANSFER LEARNING FROM PRE-TRAINED NETWORKS

The following disclosure is submitted under 35 U.S.C. 102(b)(I)(A): "Learning New Tricks From Old Dogs: Multi-Source Transfer Learning From Pre-Trained Networks," 33rd Conference on Neural Information Processing Systems (NeurIPS 2019), Vancouver, Canada, October 2019.

It is submitted that this disclosure is not prior art under AIA 35 U.S.C. 102(a)(1) because it is made by the inventor or a joint inventor and therefore qualifies as a "Grace Period Disclosure" under 35 U.S.C. § 102(b)(1)(A).

BACKGROUND

The present invention generally relates to machine learning, and more specifically, to multi-source transfer learning from pre-trained networks.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown. The resulting model can be used to perform classifications on the data.

SUMMARY

Embodiments of the present invention are directed to multi-source transfer learning from pre-trained networks.

A non-limiting example computer-implemented method includes training, by one or more processing devices, a first neural network for classification based on training data in accordance with a first learning objective, the first neural network producing an intermediate feature function and a final feature function as outputs. The computer-implemented method further includes training, by the one or more processing devices, a second neural network for classification based on the intermediate feature function and the final feature function and further based at least in part on target task samples in accordance with a second learning objective. Training the second neural network includes computing maximal correlation functions of each of the intermediate feature function, the final feature function, and the target task samples.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts an example algorithm for extracting maximal correlation parameters according to one or more embodiments described herein;

FIG. 5 depicts an example algorithm for performing prediction with maximal correlation weighting according to one or more embodiments described herein;

FIG. 6 depicts tables of experimental results on tasks for the CIFAR-100 and Tiny ImageNet datasets according to one or more embodiments described herein;

Figure 1:
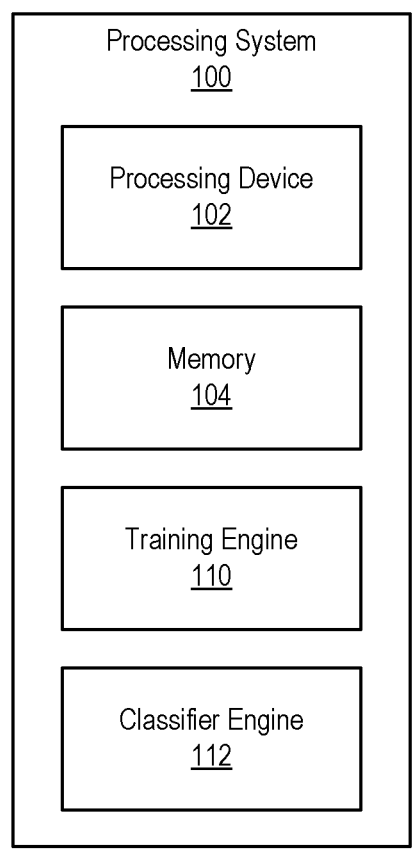
FIG. 1 depicts a block diagram of a processing system for multi-source transfer learning from pre-trained networks according to one or more embodiments described herein.

The diagrams depicted herein are illustrative. There can be many variations to the diagrams or the operations described therein without departing from the scope of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

One or more embodiments of the present invention provide techniques for multi-source transfer learning from pre-trained networks.

The advent of deep learning algorithms for mobile devices and sensors has facilitated an increase in the availability and number of systems trained on a wide range of machine learning tasks. This results in many new opportunities and challenges in the realm of transfer learning. Many conventional transfer learning techniques require some kind of control over the systems learned, either by forcing constraints on the source training or by having a joint optimization objective between tasks and requiring that all data be sent to a central source for training. However, in some cases, for practical, legal, and/or ethical reasons, control over the individual source tasks training and/or access to the source training samples may not exist. Instead, only access to features pre-trained on the data in a black box setup is available.

The development of efficient algorithms for training deep neural networks on diverse platforms with limited interaction has created both opportunities and challenges for deep learning. An emerging example involves training networks on mobile devices. In such cases, while each user's device may be training on a different set of data with a different classification objective, multi-task learning techniques can be used to leverage these separate datasets in order to transfer to new tasks for which few samples are observed.

However, most existing techniques require some aspect of control over the training on the source datasets. Either all the datasets must be located on the same device for training based on some joint optimization criterion, or the overall architecture requires some level of control over the training for each individual source dataset. In the case of, for example, object classification in images collected by users, sending this data to a central location for processing may be impractical or may even be a violation of privacy rights. Alternatively, it is possible that one might wish to use older, pre-trained classifiers for which the original training data is no longer available and to transfer them for use in a new task. In either case, it could be acceptable to transmit the neural network features learned by the device in an anonymized fashion, and to then combine the networks learned by multiple users in order to classify novel images.

This would be an example of a multi-task learning problem in which not only multiple source datasets exist, but also only pre-trained networks (whose learning objective we cannot control) are accessible from those datasets, not the underlying training data used. It is desirable to train a classifier for some new target label set given only a few target samples. Fine-tuning techniques can be used when the source network is frozen to transfer to a target domain, but these conventional techniques tend not to work very well in a few-shot setting when there are multiple networks due to the number of parameters necessary for fine-tuning, especially in an environment where features cannot be learned with the intention of transfer.

To address these problems of conventional approaches to multi-task learning, the present techniques provide a (non-linear) maximal correlation analysis approach. In particular, a useful and convenient interpretation of the features in a neural network is exploited as maximal correlation functions. The result is a technique referred to herein as maximal correlation weighting (MCW) for combining multiple pre-trained neural networks to carry out few-shot learning of a classifier to distinguish a set of never-before-seen classes. Advantageously, this technique allows for the computation of combining weights on individual feature functions in a completely decoupled fashion.

According to one or more embodiments described herein, techniques for multi-source transfer learning from pre-trained networks are provided. In particular, a multi-source learning technique is described that trains a classifier using an ensemble of pre-trained neural networks for a set of classes that have not been observed by any of the source networks and for which only very few training samples are available. By using these distributed networks as feature extractors, an effective classifier can be trained in a computationally efficient manner on very few training samples using the theory of non-linear maximal correlation functions. A maximal correlation objective can be used for weighting feature functions to build a classifier on a target task. According to one or more embodiments described herein, an MCW technique is provided for building the classifier.

Consider the following example. A set of feature functions $f_1(x), \ldots, f_k(x)$ pre-trained on a collection unknown source tasks are given along with a few samples from a novel target classification tasks with no overlapping classes $y \in Y$. The present techniques provide for training a classifier engine with only "black box" access to features and no access to source task samples.

Example embodiments of the disclosure include or yield various technical features, technical effects, and/or improvements to technology. Example embodiments of the disclosure provide for training a first neural network for classification, the first neural network producing an intermediate feature function and a final feature function as outputs. Then, a second neural network is trained based on the intermediate feature function and the final feature function and further based at least in part on target task samples. Training the second neural network can include computing maximal correlation functions of each of the intermediate feature functions, the final feature function, and the target task samples. The presently described techniques provide numerous advantages. For example, the present techniques can provide for distributed learning (e.g., combining features learned across a variety of mobile devices, each training a different neural net, with no source sample transfer between mobile devices). As another example, the present techniques enable the repurposing of ensembles of old neural networks for which the original training data is lost. As yet another example, the present techniques enable rapid adaptation to a new task given a large selection of source tasks from which to transfer. It should be appreciated that the above examples of technical features, technical effects, and improvements to technology of example embodiments of the disclosure are merely illustrative and not exhaustive.

FIG. 1 depicts a block diagram of a processing system 100 for multi-source transfer learning from pre-trained networks according to one or more embodiments described herein. The processing system 100 includes a processing device 102, a memory 104, a training engine 110, and a classifier engine 112 as shown.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., the memory 104) can store program instructions that when executed by the processing device 102 implement the engines described herein. Other engines can also be utilized to include other features and functionality described in other examples herein.

Consider a multi-task learning setup which has N different source classification tasks $\{\mathcal{T}_1^s, \ldots, \mathcal{T}_N^s\}$, for which labeled data $\{(x_1^{s_n}, y_1^{s_n}), \ldots, (x_{k_n}^{s_n}, y_{k_n}^{s_n})\}$ for task $\mathcal{T}_N^s$, $n \in \{1, \ldots, N\}$ exists. A single target task $\mathcal{T}^t$ is also given with associated labeled data $\{(x_1^t, y_1^t), \ldots, (x_k^t, y_k^t)\}$.

For this example, it is assumed that $x_i^{s_n} \in X$ for all n and i, and $x_i^t \in X$ for all i. That is, the data for the target and each source task are drawn from some common alphabet (e.g., all data are natural images). It is not assumed that any overlap occurs between labels for any pair of datasets (i.e., $y_i^{s_n} \in \mathcal{Y}^{s_n}$ for all n and i, and $y_i^t \in \mathcal{Y}^t$ for all i, where $\mathcal{Y}^t \neq \mathcal{Y}^{s_1} \neq \ldots \neq \mathcal{Y}^{s_N}$).

For each source task $\mathcal{T}_N^s$, a pre-trained neural network is accessible which is assumed to have been trained to classify $y^{s_n}$ from $x^{s_n}$. It is further assumed that the network has some number of layers corresponding to the extraction of features from $x^{s_n}$, followed by a final classification layer which maps the features to a predicted class label $\hat{y}^{s_n}$. The output of the penultimate layer is denoted as $f^{s_n}: X \to \mathbb{R}^{l_n}$, of which the ith feature is $f_i^{s_n}: X \to \mathbb{R}$, where $l_n$ is the number of features output by this layer. The final layer is denoted as $h^{s_n}: \mathbb{R}^{l_n} \to \mathcal{Y}^{s_n}$, on that the entire neural network classifier can be written as $\hat{y}=(h^{s_n} \circ f^{s_n})(x)$.

The processing system 100, using this information, trains a classifier on the target task given training samples $\{(x_1^t, y_1^t), \ldots, (x_k^t, y_j^t)\}$, with access to $h^{s_n}$ and $f^{s_n}$ for each source dataset but without any access to the underlying source training samples $\{(x_1^{s_n}, y_1^{s_n}), \ldots, (x_{k_n}^{s_n}, y_{k_n}^{s_n})\}$.

As an example context, this reflects a situation in which there are many devices (e.g., many of the processing systems 100) collecting and analyzing data but where the target learner is not allowed to access the data either because the devices have limited bandwidth and cannot transmit everything they have detected, the data is personal (i.e. pictures taken by users of a mobile app) and cannot be transmitted for privacy purposes, or the original data is otherwise lost (if the data was collected a long time ago). However, in these cases, it may still be possible to query the classifier trained on each device to get their intermediate features, which would require less information to be transmitted.

The training engine 110 of the processing system 100 uses maximal correlation analysis to train the classifier engine 112 (i.e., training neural networks for classification). Given $1 \leq k \leq K-1$ with $K=\min\{|X|, |\mathcal{Y}|\}$, the maximal correlation problem for random variables $X \in \mathcal{X}$ and $Y \in \mathcal{Y}$ is defined as $$(f^*, g^*) \triangleq \sup_{\substack{f: X \to \mathbb{R}^k, g: \mathcal{Y} \to \mathbb{R}^k \\ \mathbb{E}[f(X)] = \mathbb{E}[g(Y)] = 0 \\ \mathbb{E}[f(X)f^T(X)] = \mathbb{E}[g(Y)g^T(Y)] = I}} \mathbb{E}[f^T(X)g(Y)], \quad (1)$$

Optimal sets of uncorrelated functions $f=[f_1, \ldots, f_k]$ and $g_1=[g_1, \ldots, g_k]$ are denoted as the top-k maximal correlation functions of X and Y respectively and denote them as $f^*$ and $g^*$. The correlation of the ith maximal correlation function pair is denoted as $\sigma_i = \mathbb{E}[f^*_i(X) g^*_i(Y)]$ for $i=1, \ldots, k$. The expected values are taken over the joint distribution $P_{X,Y}$. Maximal correlations can be shown to have a number of properties that are useful in solving this multi-task learning problem. In particular, $f^*$ and $g^*$ are universally optimal in an information-preserving sense. In addition, independent of the requirement that the functions be uncorrelated, for a fixed f the optimal $\hat{g}$ that that maximizes the correlation in equation (1) is given by $$g(y) = \mathbb{E}_{P_{X|y}}[f(x)|y]. \quad (2)$$

Finally, $f^*$ and $g^*$ induce a k-mode minimum error probability estimate of y given x of the form:

$$\hat{y} = \arg\max_y \hat{P}_{Y|X}(y|x) = \arg\max_y \hat{P}_Y(y)\left(1 + \sum_{i=1}^k \sigma_i f_i^*(x) g_i^*(y)\right), \quad (3)$$

where $\hat{P}_Y(y)$ is the empirical distribution of y, which can be estimated from the data or from prior information on label distributions.

Given a fixed set of feature functions $\{f^{s_1}, \ldots, f^{s_N}\}$ it is sought to maximize the total maximal correlation objective:

$$\mathcal{L} = \mathbb{E}_{\hat{P}_{X,Y}^t}[f^T(X)g(Y)] \quad (4)$$

with respect to $G(y)$, where $F(X)=(f^{s_1}, \ldots, f^{s_N})(x)$ and $G^T(y)=(g^{s_1}, \ldots, g^{s_N})(y)$, and where the optimization is overall valid (zero-mean and unit-variance with respect to the empirical distribution of the target class labels) G for fixed F. $\hat{P}_{X,Y}^t$ is the empirical joint target distribution of X and Y. This objective (equation (4)) separates out as $$\mathcal{L} = \sum_{i,n} \mathbb{E}_{\hat{P}_{X,Y}^t}[f_i^{s_n}(X)g_i^{s_n}(Y)]. \quad (5)$$

The terms can then be solved for separately, thus:

$$g_i^{s_n}(y) = \arg\max_{g_i^{s_n}(y)} \mathcal{L} = \arg\max_{g_i^{s_n}(y)} \mathbb{E}_{\hat{P}_{X,Y}^t}[f_i^{s_n}(X)g_i^{s_n}(Y)]. \quad (6)$$

Then, for each $g_i^{s_n}(y)$, for a fixed $f_i^{s_n}$, we have from equation (2) that the optimal $g_i^{s_n}$ is given by the conditional expectation:

$$g_i^{s_n}(y) = \mathbb{E}_{\hat{P}_{X|y}^t}[f_i^{s_n}(X)], \quad (7)$$

which can then be computed from the target samples. In turn, the corresponding maximized correlation for each pair of functions $f_i^{s_n}$ and $g_i^{s_n}$ is computed via $$\sigma_{n,i} = \mathbb{E}_{\hat{P}_{X,Y}^t}[f_i^{s_n}(X)g_i^{s_n}(Y)]. \quad (8)$$

Now, equipped with the maximal correlation functions associated with each feature function, the training engine 110 can construct an MCW modal estimation of the distribution as follows:

$$\hat{P}_{Y|X}(y|x) \approx \hat{P}_Y^t(y)\left(1 + \sum_{n,i} \sigma_{n,i} f_i^{s_n}(x) g_i^{s_n}(y)\right). \quad (9)$$

A maximal likelihood estimate of y given x is then:

$$\hat{y} = \arg\max_y \hat{P}_{Y|X}(y|x) = \arg\max_y \hat{P}_Y(y)\left(1 + \sum_{n,i} \sigma_{n,i} f_i^{s_n}(x) g_i^{s_n}(y)\right). \quad (10)$$

The resulting algorithms for learning the MCW parameters and computing the MCW predictions are summarized in Algorithm 1 (see FIG. 4) and Algorithm 2 (see FIG. 5).

Computing the empirical conditional expected value requires a single pass through the data and so has linear time complexity in the number of target samples. A conditional expectation is also computed for each feature function. Thus, the time complexity of the fine-tuning is O (C+NKk), where C is the time needed to extract features from all the pre-trained networks, N is the number of networks, K is the maximum number of features per network, and k is the number of target training samples. The number of parameters grows as O (NK|y^t|), which is the number of entries needed to store all the g functions. |y^t| is the number of target class labels.

Figure 2:
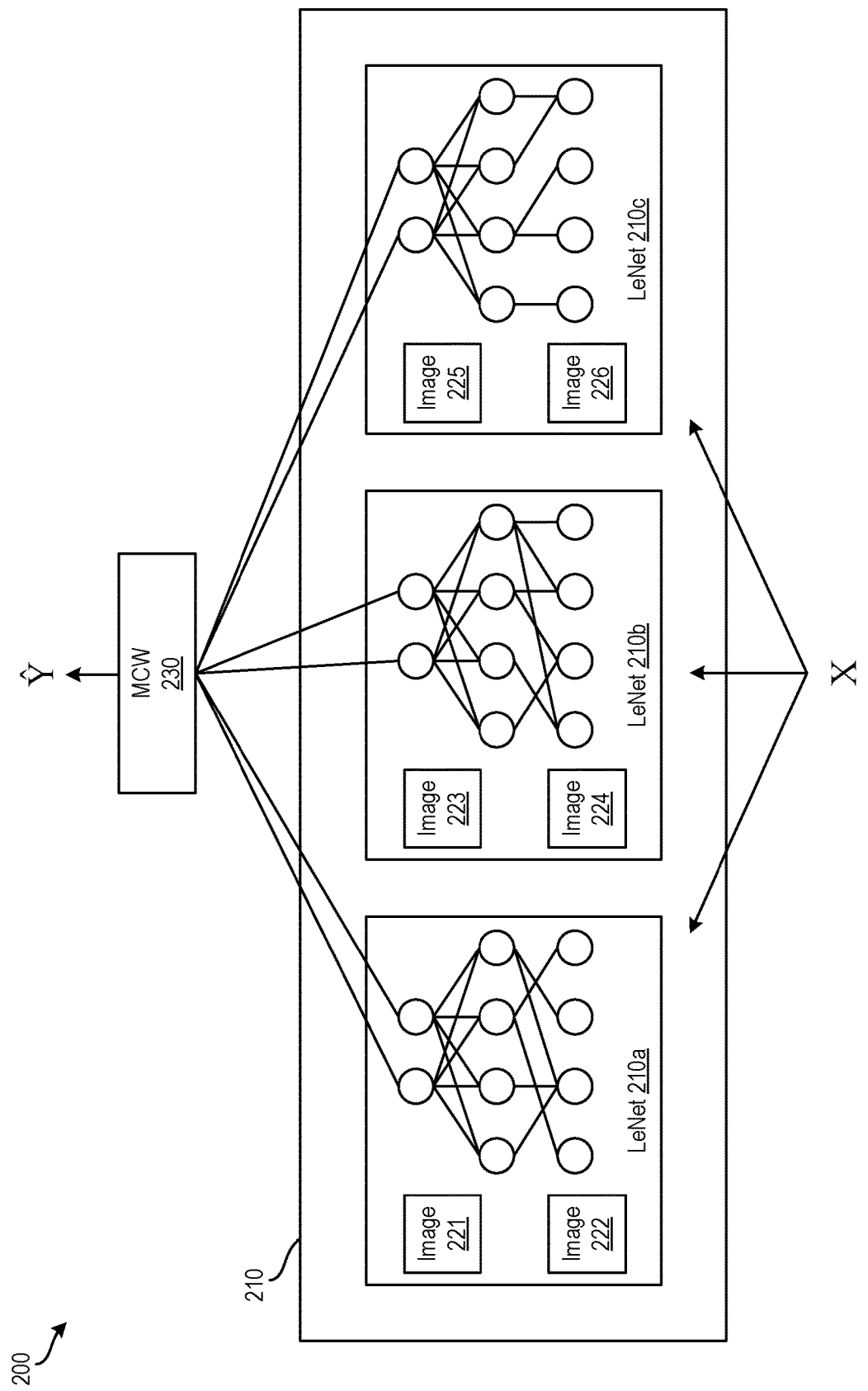
FIG. 2 depicts a block diagram of a machine learning model according to one or more embodiments described herein.

FIG. 2 depicts a block diagram of a machine learning model according to one or more embodiments described herein. In this example, a collection of pre-trained LeNets 210a, 210b, 210c (collectively "LeNets 210") and MCW 230 are used to predict a class label $\tilde{Y}$ from X using machine learning estimation. LeNets are neural networks with a LeNet architecture. Thus, for each source task, a neural net with the LeNet architecture is trained by the training engine 110 for performing classification by the classifier engine 112. It should be appreciated that the machine learning model of FIG. 2 can utilize any suitable architecture that produces a numerical output. Examples of such architectures include the LeNet architecture, the AlexNet architecture, the ResNet architecture, the VGG Net architecture, and the Inception architecture.

The LeNets 210 are each trained using a set of images 221-226 (e.g., the LeNet 210a is trained with images 221, 222; the LeNet 210b is trained with images 223, 224; the LeNet 210c is trained with images 225, 226). The penultimate layer of these LeNets 210 are used as feature functions, and MCW parameters are computed with respect to the target task as described herein. Thus, the MCW 230 is trained by the training engine 110 as a MCW modal estimation of the distribution as described herein.

For each feature function $f_i(x)$ and target task samples $((x^1, y^1), \ldots, (x^m, y^m))$, a maximal correlation function $g_i(y)$ is computed which maximizes the maximal correlation objective as follows:

$$\sigma_i = \max_{g_i(y)} \mathbb{E}[f_i(x)g_i(y)]. \tag{11}$$

The solution is given by:

$$g_i(y) = \mathbb{E}[f_i(x)|y]. \tag{12}$$

These functions are then combined with an empirical estimation of the marginal distribution $\hat{P}_Y^t(y)$ to approximate the distribution as $$\hat{P}_{Y|X}^t(y \mid x) = \hat{P}_Y^t(y)\left(1 + \sum_{i=1}^{k} \sigma_i f_i(x) g_i(y)\right). \tag{13}$$

The classifier engine 112 of FIG. 1 can then predict the class label $\tilde{Y}$ from X using machine learning estimation.

Figure 3:
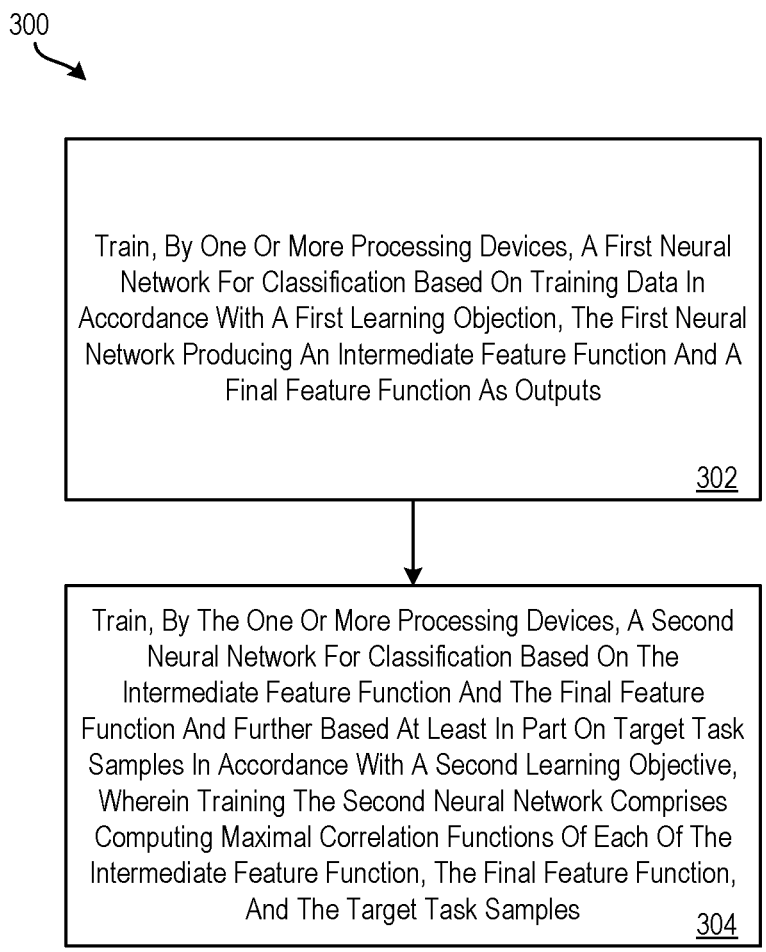
FIG. 3 depicts a flow diagram of a method for multi-source transfer learning from pre-trained networks according to one or more embodiments described herein.

FIG. 3 depicts a flow diagram of a method 300 for multi-source transfer learning from pre-trained networks according to one or more embodiments described herein. The method 300 can be performed by any suitable processing system(s) (e.g., the processing system 100 of FIG. 1, the processing system 1000 of FIG. 10, etc.), by any suitable processing device(s) (e.g., the processing device 102 of FIG. 1, the processing device 1021 of FIG. 10, etc.), and/or the like, including combinations thereof. The method 300 is described in more detail with reference to the components, engines, modules, etc., of the processing system 100 but is not intended to be so limited.

At block 302, the training engine 110 of the processing system 100 trains a first neural network for classification based on training data in accordance with a first learning objective, the first neural network producing an intermediate feature function and a final feature function as outputs.

At block 304, the training engine 110 of the processing system 100 trains a second neural network for classification based on the intermediate feature function and the final feature function and further based at least in part on target task samples in accordance with a second learning objective. According to one or more embodiments described herein training the second neural network includes computing maximal correlation functions of each of the intermediate feature functions, the final feature function, and the target task samples.

Additional processes also may be included. For example, the classifier engine 112 of the processing system 100 can make a classification decision for new data based at least in part on the maximal weighting modal estimation of distribution. It should be understood that the process depicted in FIG. 3 represents an illustration, and that other processes may be added or existing processes may be removed, modified, or rearranged without departing from the scope of the present disclosure.

The present techniques outperform conventional support vector machine approaches as shown by tables 600, 601 of experimental results of FIG. 6. In particular, FIG. 6 depicts table 600, 601 of experimental results on tasks for the CIFAR-100 and Tiny ImageNet datasets according to one or more embodiments described herein.

Figure 7:
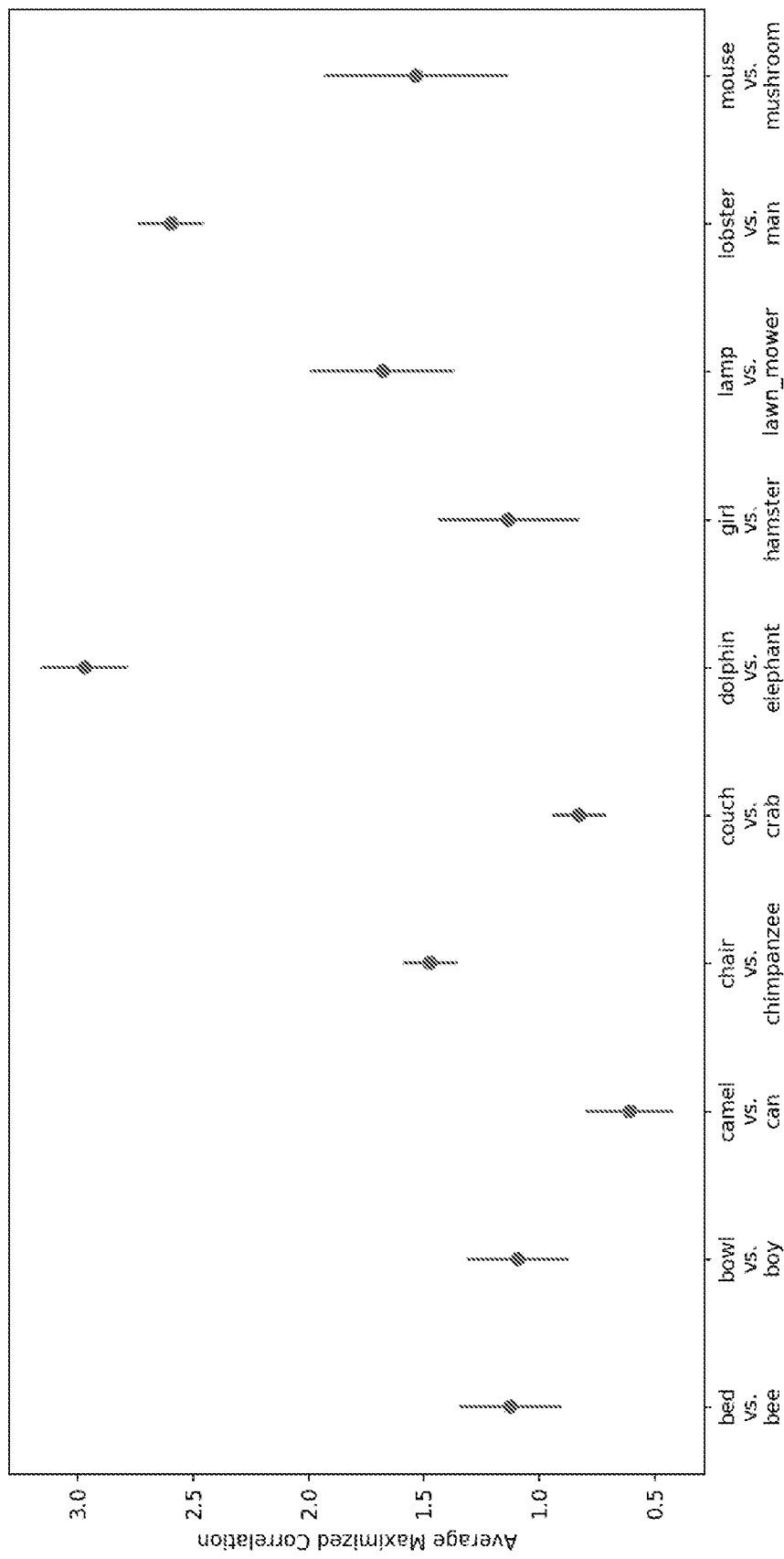
FIG. 7 depicts a graph of the average maximized correlation between image pairs according to one or more embodiments described herein.

The present techniques also enable interpretability of results for source selection as shown in the graph 700 of FIG. 7. In particular, FIG. 7 depicts a graph 700 of the average maximized correlation between image pairs (e.g., bed vs. bee, bowl vs. boy, camel vs. can, etc.) according to one or more embodiments described herein. That is, the average values of the sum of maximal correlations for each source task for a 5-shot transfer learning task on the CIFAR-100 dataset with a target task of "apple vs. fish" is depicted.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
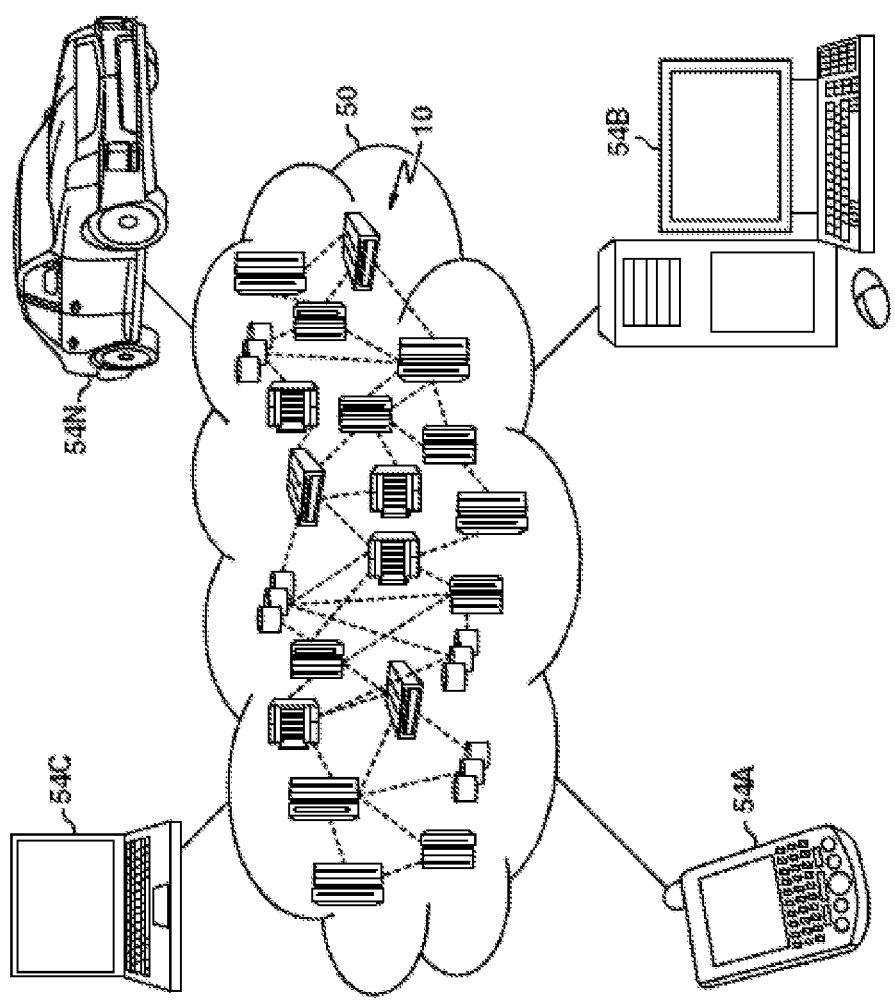
FIG. 8 depicts a cloud computing environment according to one or more embodiments described herein.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
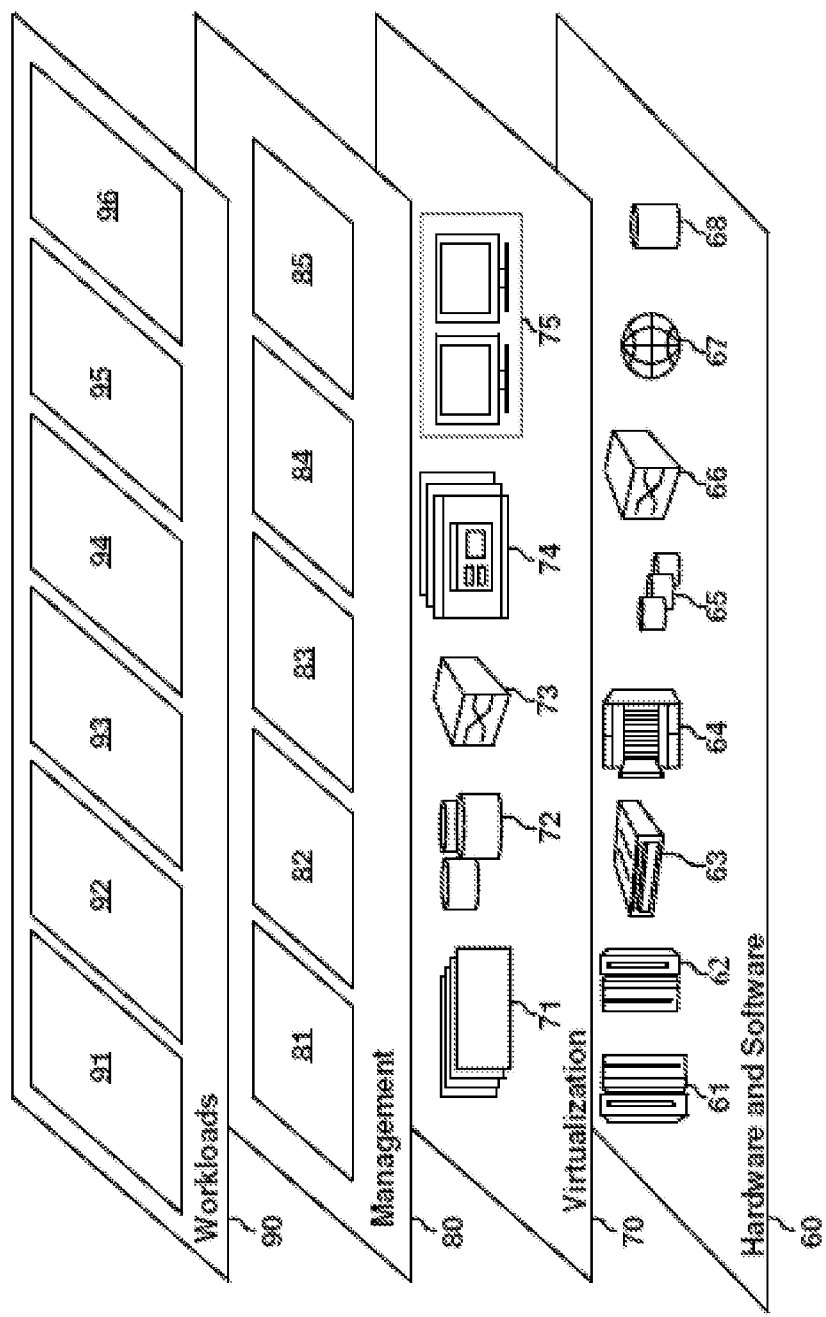
FIG. 9 depicts abstraction model layers according to one or more embodiments described herein.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-source transfer learning from pre-trained networks 96.

Figure 10:
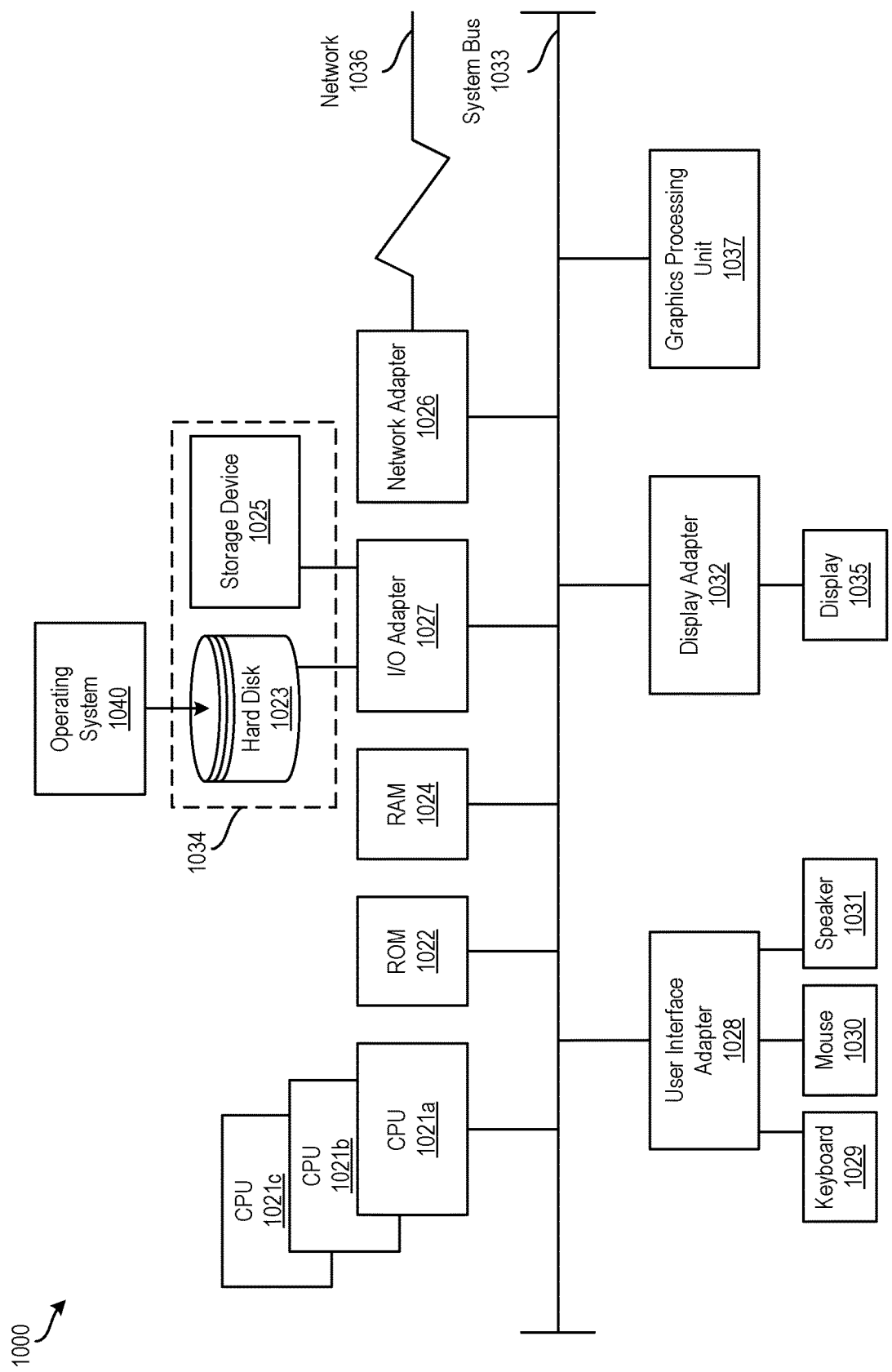
FIG. 10 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 10 depicts a block diagram of a processing system 1000 for implementing the techniques described herein. In accordance with one or more embodiments described herein, the processing system 1000 is an example of a cloud computing node 10 of FIG. 8. In examples, processing system 1000 has one or more central processing units ("processors" or "processing resources") 1021a, 1021b, 1021c, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1023 and/or a storage device 1025 or any other similar component. I/O adapter 1027, hard disk 1023, and storage device 1025 are collectively referred to herein as mass storage 1034. Operating system 1040 for execution on processing system 1000 may be stored in mass storage 1034. The network adapter 1026 interconnects system bus 1033 with an outside network 1036 enabling processing system 1000 to communicate with other such systems.

A display (e.g., a display monitor) 1035 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O busses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 may be interconnected to system bus 1033 via user interface adapter 1028, which may include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store the operating system 1040 such as the AIX® operating system from IBM Corporation to coordinate the functions of the various components shown in processing system 1000.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
    training, by one or more processing devices, a first neural network for classification based on training data in accordance with a first learning objective, the first neural network producing an intermediate feature function and a final feature function as outputs; and training, by the one or more processing devices, a second neural network for classification based on the intermediate feature function and the final feature function and further based at least in part on target task samples in accordance with a second learning objective, wherein training the second neural network comprises computing maximal correlation functions of each of the intermediate feature function, the final feature function, and the target task samples.

2. The computer-implemented method of claim 1, further comprising:
making, by the one or more processing devices, a classification decision for new data.

3. The computer-implemented method of claim 1, wherein making the classification decision for the new data is based at least in part on a maximal weighting modal estimation of distribution.

4. The computer-implemented method of claim 3, wherein the maximal weighting estimation of the distribution is based on the following equation:

$$\hat{P}_{Y|X}(y|x) \approx \hat{P}'_Y(y)\left(1 + \sum_{n,i}\sigma_{n,i}f_i^{s_n}(x)g_i^{s_n}(y)\right).$$

5. The computer-implemented method of claim 1, wherein the training data represents an image.

6. The computer-implemented method of claim 1, wherein the maximal correlation function for each of the intermediate feature function, the final feature function, and the target task samples is computed based on the following equation:

$$\sigma_i = \max_{g_i(y)} \mathbb{E}[f_i(x)g_i(y)].$$

7. The computer-implemented method of claim 1, wherein the first neural network is a LeNet architecture network.

8. The computer-implemented method of claim 1, wherein the first neural network is of an architecture that produces a numerical output.

9. A system comprising:
a memory comprising computer readable instructions; and
one or more processing devices for executing the computer readable instructions, the computer readable instructions controlling the processing device to perform operations comprising:
training, by the one or more processing devices, a first neural network for classification based on training data in accordance with a first learning objective, the first neural network producing an intermediate feature function and a final feature function as outputs; and
training, by the one or more processing devices, a second neural network for classification based on the intermediate feature function and the final feature function and further based at least in part on target task samples in accordance with a second learning objective, wherein training the second neural network comprises computing maximal correlation functions of each of the intermediate feature function, the final feature function, and the target task samples.

10. The system of claim 9, wherein the operations further comprise:
making, by the one or more processing devices, a classification decision for new data.

11. The system of claim 9, wherein making the classification decision for the new data is based at least in part on a maximal weighting modal estimation of distribution.

12. The system of claim 11, wherein the maximal weighting estimation of the distribution is based on the following equation:

$$\hat{P}_{Y|X}(y|x) \approx \hat{P}'_Y(y)\left(1 + \sum_{n,i}\sigma_{n,i}f_i^{s_n}(x)g_i^{s_n}(y)\right).$$

13. The system of claim 9, wherein the training data represents an image.

14. The system of claim 9, wherein the maximal correlation function for each of the intermediate feature function, the final feature function, and the target task samples is computed based on the following equation:

$$\sigma_i = \max_{g_i(y)} \mathbb{E}[f_i(x)g_i(y)].$$

15. The system of claim 9, wherein the first neural network is a LeNet architecture network.

16. The system of claim 9, wherein the first neural network is of an architecture that produces a numerical output.

17. A computer program product comprising a non-transitory computer readable storage medium having program instructions embodied therewith, the program instructions executable by one or more processors to cause the one or more processor to perform operations comprising:
training, by the one or more processors, a first neural network for classification based on training data in accordance with a first learning objective, the first neural network producing an intermediate feature function and a final feature function as outputs; and
training, by the one or more processors, a second neural network for classification based on the intermediate feature function and the final feature function and further based at least in part on target task samples in accordance with a second learning objective, wherein training the second neural network comprises computing maximal correlation functions of each of the intermediate feature function, the final feature function, and the target task samples.

18. The computer program product of claim 17, wherein the operations further comprise:
making, by the one or more processors, a classification decision for new data.

19. The computer program product of claim 17, wherein making the classification decision for the new data is based at least in part on a maximal weighting modal estimation of distribution.

20. The computer program product of claim 19, wherein the maximal weighting estimation of the distribution is based on the following equation:

$$\hat{P}_{Y|X}(y|x) \approx \hat{P}'_Y(y)\left(1 + \sum_{n,i}\sigma_{n,i}f_i^{s_n}(x)g_i^{s_n}(y)\right).$$

* * * * *